United States Patent
Zhang et al.

(10) Patent No.: US 12,093,941 B2
(45) Date of Patent: Sep. 17, 2024

(54) MULTI-INPUT TRANSACTIONS

(71) Applicant: NCHAIN LICENSING AG, Zug (CH)

(72) Inventors: Wei Zhang, London (GB); Jack Davies, London (GB); Craig Wright, London (GB)

(73) Assignee: nChain Licensing AG, Zug (CH)

( * ) Notice: Subject to any disclaimer, the term of this patent is extended or adjusted under 35 U.S.C. 154(b) by 104 days.

(21) Appl. No.: 17/612,178

(22) PCT Filed: Apr. 21, 2020

(86) PCT No.: PCT/IB2020/053764
§ 371 (c)(1),
(2) Date: Nov. 17, 2021

(87) PCT Pub. No.: WO2020/240290
PCT Pub. Date: Dec. 3, 2020

(65) Prior Publication Data
US 2022/0222661 A1 Jul. 14, 2022

(30) Foreign Application Priority Data
May 24, 2019 (GB) ...................... 1907344

(51) Int. Cl.
*G06Q 20/38* (2012.01)
*G06Q 20/06* (2012.01)
*G06Q 20/40* (2012.01)

(52) U.S. Cl.
CPC ....... *G06Q 20/3829* (2013.01); *G06Q 20/065* (2013.01); *G06Q 20/3823* (2013.01); *G06Q 20/3825* (2013.01); *G06Q 20/4014* (2013.01)

(58) Field of Classification Search
CPC ............. G06Q 20/3829; G06Q 20/065; G06Q 20/3823; G06Q 20/3825; G06Q 20/4014;
(Continued)

(56) References Cited

U.S. PATENT DOCUMENTS

| | | |
|---|---|---|
| 8,789,180 B1 | 7/2014 | Yang et al. |
| 8,826,015 B2 | 9/2014 | Lakshminarayanan et al. |
| 9,621,650 B2 | 4/2017 | Raman et al. |
| 10,250,708 B1 * | 4/2019 | Carver ................ H04L 67/1042 |
| 10,521,861 B1 * | 12/2019 | Ju ........................ G06Q 20/389 |

(Continued)

FOREIGN PATENT DOCUMENTS

| | | | |
|---|---|---|---|
| EP | 3259725 A1 * | 12/2017 | ......... G06F 16/1834 |
| ES | 2875581 T3 | 11/2021 | |

(Continued)

OTHER PUBLICATIONS

"Bitcoin Timelocks in a nutshell", Robin Hung, Oct. 21, 2017, <https://medium.com/@RobinHung/bitcoin-timelocks-in-a-nutshell-4c95aafc7a59> (Year: 2017).*
(Continued)

*Primary Examiner* — Duan Zhang
(74) *Attorney, Agent, or Firm* — Messner Reeves LLP

(57) ABSTRACT

A method comprising: providing a first transaction specifying an output amount of a digital asset to greater than pointed to by its inputs, wherein an output of the first transaction comprises a locking script specifying a condition; over a side channel, receiving an input from each of multiple users, and adding each received input to the first transaction; and once a target is reached, whereby the total input amount pointed to by the inputs of the first transaction is equal to or exceeds the output amount, causing the first transaction and a second transaction to be published to a blockchain network to be recorded in a blockchain. The second transaction comprises an input pointing to the output of the first transaction and comprising an unlocking script meeting said condition. The condition requires the unlocking script to include a media key enabling the users to access the item of media content.

18 Claims, 6 Drawing Sheets

(58) Field of Classification Search
CPC ....... H04L 9/3239; H04L 9/3247; H04L 9/50; H04L 63/0442
See application file for complete search history.

(56) References Cited

U.S. PATENT DOCUMENTS

| | | | |
|---|---|---|---|
| 10,776,761 | B2 | 9/2020 | Macgregor et al. |
| 2003/0023537 | A1 | 1/2003 | Joshi et al. |
| 2004/0210884 | A1 | 10/2004 | Raghavachari et al. |
| 2008/0168469 | A1 | 7/2008 | Feingold et al. |
| 2013/0218709 | A1 | 8/2013 | Jain |
| 2015/0178725 | A1 | 6/2015 | Poetsch |
| 2016/0260171 | A1 | 9/2016 | Ford et al. |
| 2017/0255912 | A1 | 9/2017 | Casebolt |
| 2018/0293629 | A1 | 10/2018 | Roman |
| 2019/0012695 | A1 | 1/2019 | Bishnoi et al. |
| 2019/0028276 | A1* | 1/2019 | Pierce ............... G06Q 20/3825 |
| 2019/0028278 | A1 | 1/2019 | Gilson |
| 2019/0057382 | A1* | 2/2019 | Wright .................... H04L 9/321 |
| 2019/0058910 | A1 | 2/2019 | Solow |
| 2019/0095879 | A1 | 3/2019 | Eyal et al. |
| 2019/0095909 | A1 | 3/2019 | Wright et al. |
| 2019/0121988 | A1* | 4/2019 | van de Ruit .......... H04L 9/0825 |
| 2019/0149337 | A1 | 5/2019 | Savanah et al. |
| 2019/0205844 | A1 | 7/2019 | Nuzzi |
| 2019/0362388 | A1 | 11/2019 | Bugga et al. |
| 2020/0202350 | A1 | 6/2020 | Chan et al. |
| 2021/0217002 | A1 | 7/2021 | Basu et al. |
| 2021/0314396 | A1 | 10/2021 | Basu et al. |
| 2023/0370283 | A1 | 11/2023 | Chan |

FOREIGN PATENT DOCUMENTS

| | | | | |
|---|---|---|---|---|
| JP | 6487091 | B1 | 3/2019 | |
| JP | 2019507446 | A | 3/2019 | |
| JP | 2019511147 | A | 4/2019 | |
| JP | 2019511766 | A | 4/2019 | |
| WO | 2017145016 | | 8/2017 | |
| WO | WO-2017163220 | A1 * | 9/2017 | ............. G06Q 20/02 |
| WO | 2017178955 | A1 | 10/2017 | |
| WO | 2018020389 | A2 | 2/2018 | |
| WO | 2018020389 | A3 | 3/2018 | |
| WO | 2018078520 | A1 | 5/2018 | |
| WO | 2018092443 | A1 | 5/2018 | |
| WO | 2018189667 | A1 | 10/2018 | |
| WO | 2018211382 | A1 | 11/2018 | |
| WO | 2019010459 | A1 | 1/2019 | |
| WO | 2019040855 | A1 | 2/2019 | |
| WO | WO-2019034984 | A1 * | 2/2019 | ......... G06F 16/2379 |
| WO | 2019043538 | A1 | 3/2019 | |
| WO | 2019197926 | | 10/2019 | |
| WO | 2021127115 | A1 | 6/2021 | |

OTHER PUBLICATIONS

Aitzhan N.Z., et al., "Security and Privacy in Decentralized Energy Trading through Multi-Signatures, Blockchain and Anonymous Messaging Streams," IEEE TDSC, 2016, 14 pages.
Radhakrishnan R., at al., "Streaming Data Payment Protocol (SDPP) for the Internet of Things," IEEE Confs on Internet of Things, 2018, pp. 1679-1684.
Robin Hung, Bitcoin Timelocks in a nutshell, webpage, Oct. 21, 2017, Medium Post https://medium.com/@RobinHung/bitcoin-timelocks-in-a-nutshell-4c95aafc7a59.
Payment Channels, Bitcoin Wiki, webpage, Jan. 17, 2019 https://en.bitcoin.it/wiki/Payment_channels.
Craig Wright, The Start of Metanet, webpage, Feb. 14, 2019, Medium Post https://medium.com/@craig_10243/the-start-of-metanet-ef0560e81505.
Ryan X. Charles, Payment Channels, Craig Wright, and Money Button, webpage YouTube post, Feb. 14, 2019, https://www.youtube.com/watch?v=S6rd1KbF7sc.
Ryan X Charles has epiphany on importance of malleability for Bitcoin/Metanet, Reddit discussion, https://old.reddit.com/r/bitcoincashSV/comments/ar75It/ryan_x_charles_has_epiphany_on_importance_of/.
Shadders, On forks, orphans and reorgs, May 21, 2019, https://www.yours.org/content/on-forks--orphans-and-reorgs-0c0c39d3c79b.
Payment Channels, Bitcoin Wiki, https://en.bitcoin.it/wiki/Payment_channels.
Combined Search and Examination Report for Great Britain Application No. GB1907339.4, dated Nov. 22, 2019, 8 pages.
Combined Search and Examination Report under Sections 17 and 18(3) for Application No. GB1907340.2 dated Nov. 22, 2019, 7 pages.
Combined Search and Examination Report under Sections 17 and 18(3) for Application No. GB1907343.6 dated Nov. 22, 2019, 6 pages.
Combined Search and Examination Report under Sections 17 and 18(3) for Application No. GB1907344.4 dated Nov. 25, 2019, 6 pages.
International Search Report and Written Opinion for International Application No. PCT/IB2020/053764 dated Jul. 30, 2020, 13 pages.
International Search Report and Written Opinion for International Application No. PCT/IB2020/053765 dated Jul. 24, 2020, 14 pages.
International Search Report and Written Opinion for International Application No. PCT/IB2020/053771 dated Jul. 28, 2020, 15 pages.
International Search Report and Written Opinion for International Application No. PCT/IB2020/053815 dated Jun. 22, 2020, 12 pages.
Pittl B., et al., "Bazaar-Blockchain: A Blockchain for Bazaar-Based Cloud Markets," 2018 IEEE International Conference on Services Computing (SCC), IEEE, Jul. 2, 2018, pp. 89-96.
Shi F., et al., "OPPay: Design and Implementation of A Payment System for Opportunistic Data Services", 2017 IEEE 37th International Conference on Distributed Computing Systems, Jun. 2017, pp. 1618-1628.
Fuchita Y., "Special Feature: Innovation and Finance—Blockchain and Financial Transaction innovation," Nomura Capital Markets Quarterly, Japan, Nomura Institute of Capital Markets Research, Nov. 1, 2015, vol. 19, No. 2, 30Pages.
Office Action for Japanese Patent Application No. 2021-567834, mailed on May 14, 2024, 8 pages.

* cited by examiner

MULTI-INPUT TRANSACTIONS

CROSS REFERENCE TO RELATED APPLICATIONS

This application is the U.S. National Stage of International Application No. PCT/IB2020/053764 filed on Apr. 21, 2020, which claims the benefit of United Kingdom Patent Application No. 1907344.4, filed on May 24, 2019, the contents of which are incorporated herein by reference in their entireties.

TECHNICAL FIELD

The present disclosure relates to a mechanism for delivering content to users which exploits the concept of input-level malleability in the context of a blockchain based system, i.e. the ability to add (or remove) inputs of a transaction without invalidating the transaction.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes each propagate (valid) transactions to one or more other nodes, thus between them propagating the transactions throughout the nodes of the network. Mining nodes each compete to perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. A transaction may optionally also specify an extra mining fee for the successful miner. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction. The first transaction comprises at least one output specifying an amount of the digital asset, and comprising a locking script defining one or more conditions of unlocking the output. The second transaction comprises at least one input, comprising a pointer to the output of the first transaction, and an unlocking script for unlocking the output of the first transaction.

In such a model, when the second transaction is sent to the P2P network to be propagated and recorded in the blockchain, one of the criteria for validity applied at each node will be that the unlocking script meets the requirement defined in the locking script of the first transaction. Another condition for the second transaction to be valid is that the output of the first transaction has not already been redeemed by another valid transaction. Any node that finds the target transaction invalid according to any of these conditions will not propagate it nor include it for mining into a block to be recorded in the blockchain. Another condition is typically that the total amount of digital asset specified by the output(s) does not exceed the total amount pointed to by the input(s) of the transaction. Assuming this is not the case, in most protocols any positive difference between the total output amount and total input amount is implicitly left as an additional mining fee on top of the amount awarded in the generation transaction. Nowadays, in practice, the total input amount will need to exceed the total output amount by a sufficient mining fee in order to have the transaction accepted by miners, even if it is valid (the protocol typically does not force miners to accept a valid transaction into their pool, the must be incentivized to do so).

Returning to the idea of the locking script, say that the target transaction is to convey an amount of digital asset from a first party ("Alice") to a second party ("Bob"). One of the requirements defined in the locking script of the preceding, first transaction is typically that the unlocking script of the second transaction contains a cryptographic signature of Alice. The signature has to be produced by Alice signing a part of the second transaction. Which part this is may be flexibly defined by the unlocking script, or may be an inherent feature of the node protocol, depending on the protocol being used. Nonetheless, the part to be signed typically excludes some other part of the second transaction, e.g. some or all of the unlocking script itself.

This creates the possibility of "malleability". I.e. before mining, the part of the second transaction which is not signed can be modified ("malleated") without invalidating the transaction. Malleability is a known concept in cryptography generally, where it is usually seen as a security concern whereby a message can be maliciously modified but still accepted as genuine. In the context of a blockchain, malleability is not necessarily a concern but is merely known as a curious artefact whereby a certain part of a transaction can be modified without invalidating it.

Recently a proposal has been made to deliberately exploit malleability in order to use a transaction as a carrier of media data. The data content can be included in the unlocking script of a transaction, and this transaction is then sent between parties over a side channel. One of the parties then malleates the transaction to remove the data, and sends the malleated version onward to the P2P network to be mined (whereas if the data was not removed then the transaction would bloat the blockchain, and typically also require a higher mining fee, since the reward required by miners to accept a transaction typically scales with the data size of the transaction).

A side channel such as a payment channel allows transactions or transaction-related data to be exchanged between parties "off chain" before the transactions are broadcast to the P2P network to be recorded in the blockchain. The side channel is separate from the P2P overlay network, and hence any transaction sent over the side channel will not (yet) be propagated throughout the network for recordal in the blockchain until one of the parties chooses to publish it to the network. Typical payment channels require a "funding transaction" whereby both parties effectively escrow their funds together. The funding transaction is broadcast to set up the channel, and then once the service in question has been provided, a settlement transaction is broadcast to close the channel and spends the funding transaction.

There have also been some existing proposals for a "micropayment channel", i.e. to send a sequence of transactions from one party ("Alice") to another party ("Bob") in order to pay Bob in small instalments. This would not require a funding transaction. At least one existing proposal is to use a side channel for streaming the data of a movie in packets. Bob would send Alice a sequence of packets of the data, and in response to each packet, Alice would return a respective transaction which Bob can then broadcast onward to the network to obtain payment for the respective packet of the movie.

Another, separately known use of a side channel is to allow for crowdfunding of a transaction. The party raising funds, say Bob, creates a template transaction with at least one output specifying a desired amount to be transferred to himself or a third party on whose behalf he is acting. However this transaction does not yet contain enough inputs to reach the target amount. Hence the template transaction is initially invalid since the total amount of the digital asset pointed to by its inputs is less than the total payment specified in its output. Bob makes the template transaction available to the public by publishing it off-chain on a server. Members of the public can then malleate the template transaction on the server by adding inputs, which will gradually add up towards the target amount until the transaction becomes valid. Once the target is reached, Bob publishes it to the P2P network to have it mined into a block. In practice the target will need to slightly exceed the specified payment to Bob in order to cover the mining fee.

SUMMARY

An issue with the existing scheme for delivering content to a user via a micropayment channel is that it only allows for a one-to-one relationship between streamer and individual streamee: a single user has to pay for each packet of data to be streamed, and that packet is then returned to that specific individual user via the side channel. If a separate user wanted to stream the same content, they would need to replicate this process with the streamer, sending their own stream of transactions each paying the streamer again for each respective packet. Over many users, this will have the effect of increasing network congestion over the P2P network and also bloating the blockchain, due to the large number of transactions needed to be published to the network and recorded in the blockchain (one transaction per user per packet).

As an alternative, in principle the crowdfunding technique could be used to enable multiple parties to fund a piece of content collectively, by each adding inputs to a common transaction. This would mean that the number of transactions that needed to be published to the P2P network would only scale per packet or chunk of content, not per user, thus mitigating the issue of network congestion and bloating of the blockchain. However, an issue with the existing crowdfunding idea is that it provides no integrated mechanism for releasing content to users once the crowdfunding target is reached.

The present disclosure provides an on-chain, integrated mechanism for releasing crowdfunded content to users.

According to one aspect disclosed herein, there is provided a computer-implemented method of enabling a plurality of users to access an item of media content. The method comprises, by a vendor of the media content: providing a first transaction comprising i) one or more outputs including at least a first output specifying an amount of a digital asset to transfer to the vendor, and ii) initially, a total of zero or more inputs wherein a total input amount of the digital asset specified in any outputs of any source transactions pointed to by the zero or more inputs is less than a total output amount of the digital asset specified by the one or more outputs. The first output of the first transaction comprises a locking script specifying a condition to be met by an unlocking script to unlock said first output. The method further comprises, over a side channel, receiving an input from each of said plurality of users, and adding each received input to the first transaction, each received input pointing to an output of a respective source transaction specifying an amount of the digital asset. Once a target is reached, whereby a total input amount pointed to by the inputs of the first transaction is equal to or exceeds the output amount, the method then comprises causing the first transaction and a second transaction to be published to a blockchain network to be recorded in a blockchain, wherein the second transaction comprises an input pointing to the first output of the first transaction and comprising the unlocking script meeting said condition. The condition specified by the locking script requires the unlocking script to include a media key enabling the users to access the item of media content.

The first transaction is hosted on a server at least until the target is reached, with the inputs received from the users being received at the server and added to the first transaction as stored at the server (where a server herein may refer to any serving computer equipment implemented in one or more physical units at one or more geographic sites).

For each of a plurality of transactions including the target transaction, at least some nodes of the network are configured to propagate each transaction on condition of the transaction being valid, and at least some nodes are configured to record each transaction in the copy of the blockchain at that node on condition of the transaction being valid. The validity of the first transaction is conditional on the total input amount being at least equal to the total output amount. This means that the transaction cannot be valid until enough inputs have been collected from users (e.g. Alice, Adam, Agnes, etc.) to meet the target. Further, the validity of the second transaction is conditional on the unlocking script unlocking the output of the first transaction. This means that the party performing the method (e.g. Bob) must publish the unlocking key onto the blockchain if he wishes to claim the output amount. Once the key is thus immutably published on the publicly-inspectable blockchain, this enables the users to retrieve the unlocking key and use it to consume the item of data in question from the off-chain data source. Optionally Bob may also send the unlocking key to one, some or all of the users directly over the side channel instead of requiring them to retrieve it from the blockchain, but the fact that it has to be made public on the blockchain enables the users to retrieve it themselves from the blockchain if Bob does not send it to them separately, and thus Bob cannot cheat the system.

In embodiments, the method may comprise repeating said method for each of a plurality of items of data, wherein each item of content forms a different respective one of a sequence of portions of media content. E.g. the piece of media content may comprise text, audio and/or video content. It may comprise for example an episode of a TV or spoken-word show, a movie, or a series of episodes of a show. In embodiments the portions may be packets of a given episode or stand-alone show or movie streamed to the users in real-time, e.g. a TV show or spoken word show. Alternatively the portions may be different episodes of a series, for example.

According to another aspect of the present disclosure, there is provided a corresponding method performed by one of the users.

According to further aspects disclosed herein, there are provided a program for performing the method, and/or computer equipment programmed to perform the method of the vendor or user.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

System Overview

Figure 1:
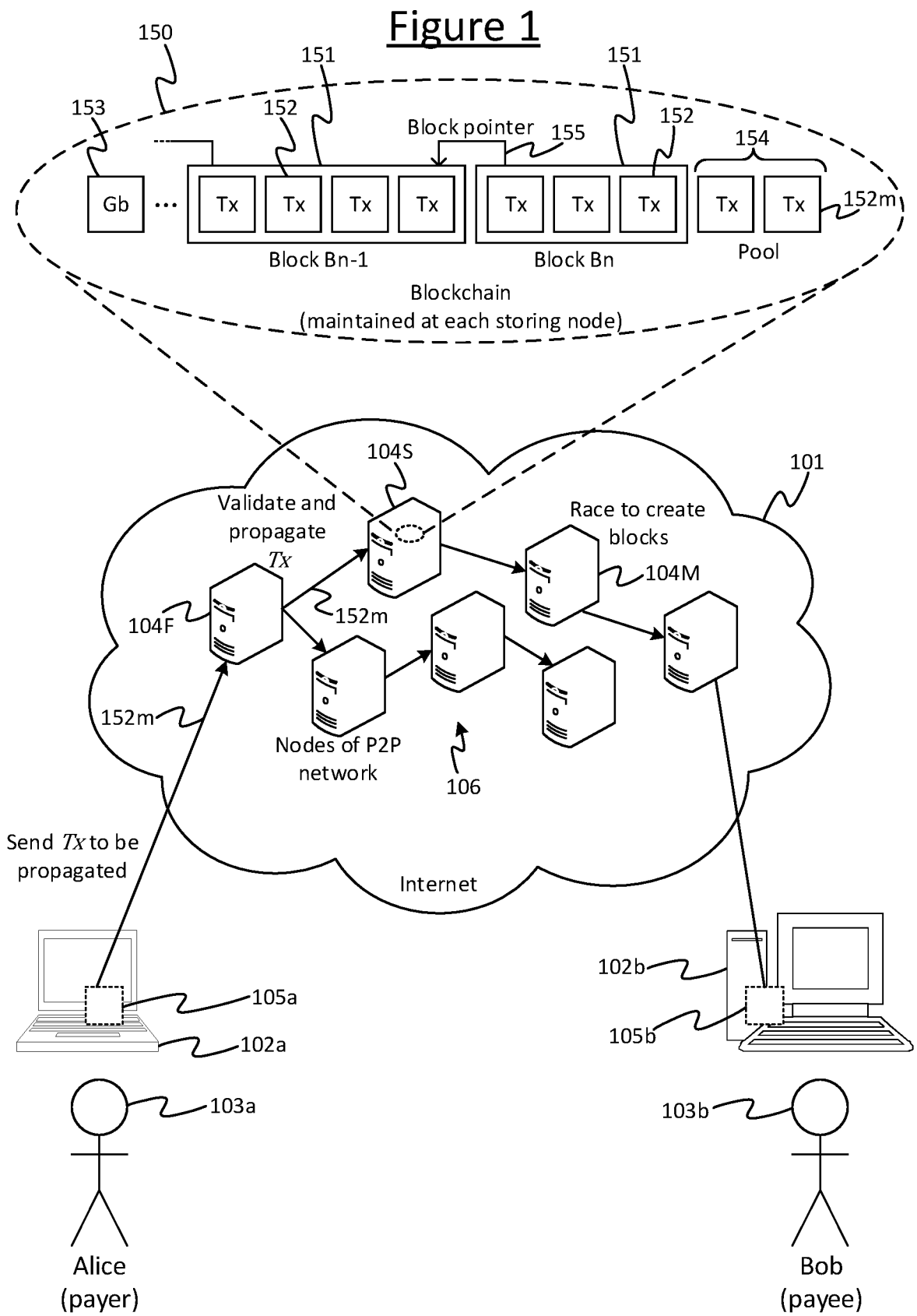
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the pool 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the signature of the user 103$a$ to whom the output of the preceding transaction 152$i$ is locked. In turn, the output of the present transaction 152$j$ can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. The present disclosure relates to an output-based model rather than account-based.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transaction 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152$j$ to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152$j$, it handles it in accordance with the node protocol and its respective role. This comprises first checking whether the newly received transaction 152$j$ meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152$j$ passes the test for being deemed valid (i.e. on condition that it is "validated"), any storage node 104S that receives the transaction 152$j$ will add the new validated transaction 152 to the pool 154 in the copy of the blockchain 150 maintained at that node 104S. Further, any forwarding node 104F that receives the transaction 152$j$ will propagate the validated transaction 152 onward to one or more other nodes 104 in the P2P network 106. Since each forwarding node 104F applies the same protocol, then assuming the transaction 152$j$ is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

Figure 2:
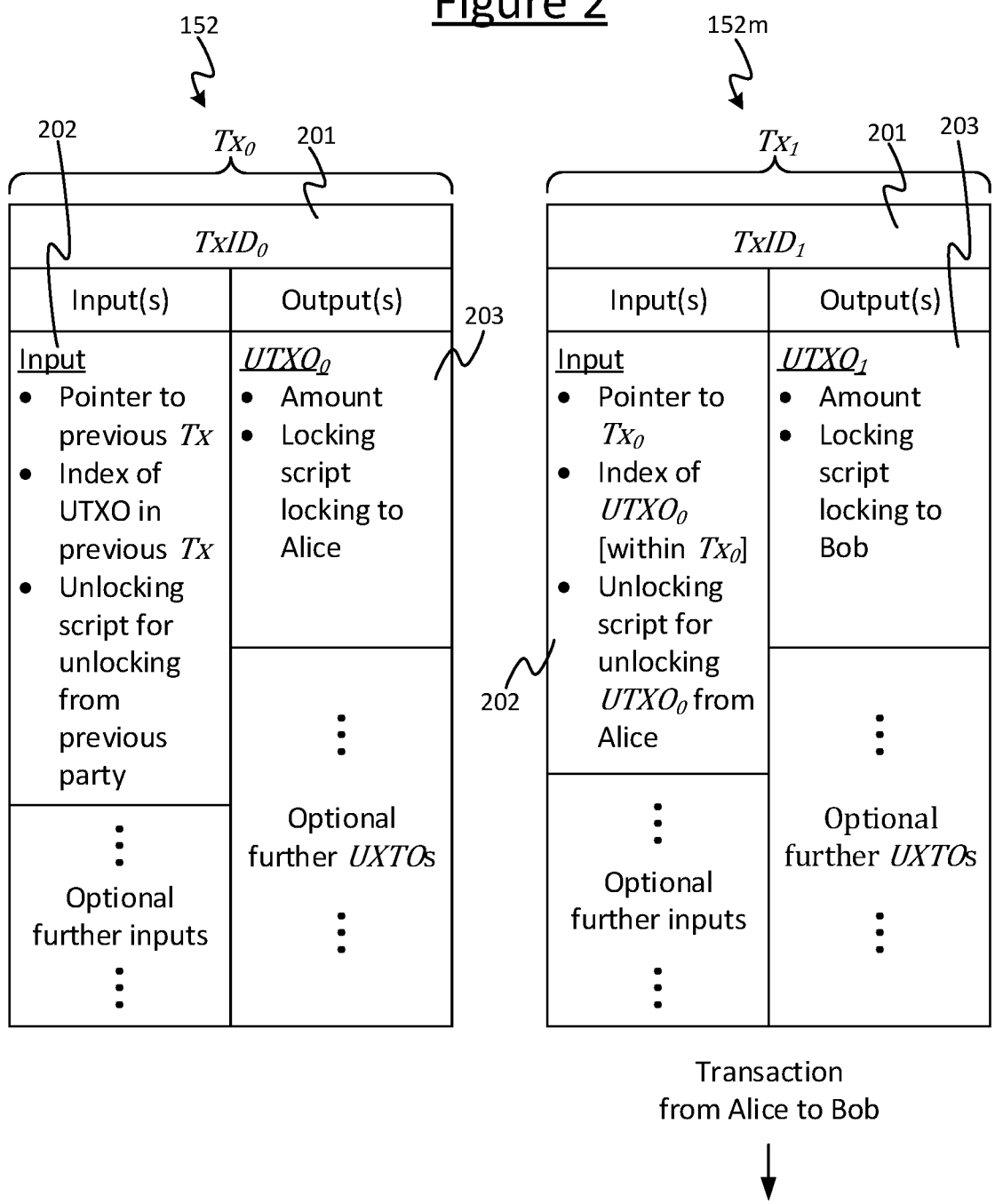
FIG. 2 schematically illustrates some examples of transactions which may be recorded in a blockchain.

FIG. 2 illustrates an example transaction protocol. This is an example of an UTXO-based protocol. A transaction 152 (abbreviated "$T_x$") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103$a$ wishes to create a transaction 152$j$ transferring an amount of the digital asset in question to Bob 103$b$. In FIG. 2 Alice's new transaction 152$j$ is labelled "$Tx_1$". It takes an amount of the digital asset that is locked to Alice in the output 203 of a preceding transaction 152$i$ in the sequence, and transfers at least some of this to Bob. The preceding transaction 152$i$ is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>| | [Checksig $P_A$]

where "| |" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)> OP_EQUALVERIFY OP_CHECKSIG. "OP_..." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Figure 3:
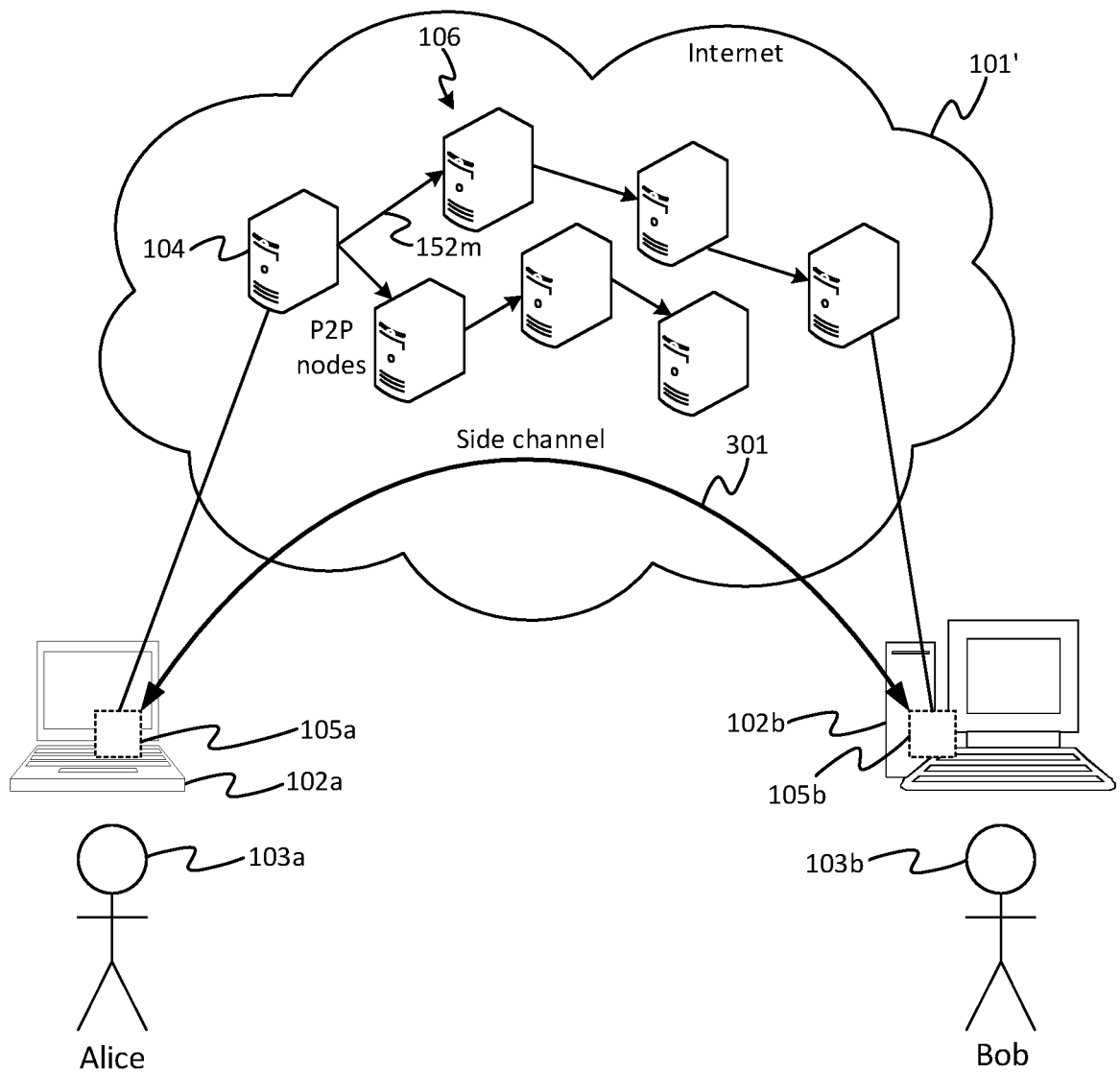
FIG. 3 is a schematic block diagram of another system for implementing a blockchain.

FIG. 3 shows a system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Such a side channel 301 is sometimes referred to as a "payment channel".

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Example Definitions

The following are some example definitions which may be adopted in some implementations. Note that these are not all limiting on all possible implementations and are provided only to aid understanding of certain possible implementations, such as may be employed in some possible implementations of the later-described example use cases.

Definition 1: Transaction. A transaction is a message that contains inputs and outputs. It may also comprise a protocol version number and/or a locktime. The protocol version indicates the version of the transaction protocol. Locktime will be explained separately later.

Definition 2: Inputs. The inputs of a transaction form an ordered list. Each entry in the list comprises an outpoint (identifier for unspent transaction output), and scriptSig (unlocking script). It may also comprise a sequence number.

Definition 3: Outputs. The outputs of a transaction form an ordered list. Each entry in the list comprises a value (the amount of the digital asset in its fundamental units), and scriptPubKey (locking script).

Definition 4: Outpoint. An outpoint is uniquely defined by a transaction ID TxID and an index number i. It refers to the ith entry in the outputs of the transaction TxID, giving the unique location of an unspent transaction output (UTXO). The term 'unspent' here means that the outpoint has never appeared in any valid subsequent transaction.

Definition 5: scriptSig. This is the information required to unlock or to spend the UTXO corresponding to a given outpoint. In a standard transaction, this information is usually an ECDSA signature. Therefore, the script is called 'scriptSig'. However, the required information to unlock the outpoint can be any data that satisfies the locking conditions of the UTXO.

Definition 6: scriptPubKey. This is a script that locks the fund associated with a particular UTXO. The funds are unlocked, and can be spent, if and only if a scriptSig is appended to a scriptPubKey and the execution of the combined script gives TRUE. If this is not the case, the transaction is invalid and will be rejected. It is called 'scriptPubKey' because it generally contains the hash value of an ECDSA public key for standard transactions.

In the next definition, where reference is made to signing an input or inputs, this means to sign an input or inputs excluding the scriptSig part (see Definition 2).

Definition 7: SIGHASH flag. When providing an ECDSA signature, one needs also to append one of the following SIGHASH flags.

| Flag | Functional meaning |
| --- | --- |
| SIGHASH_ALL | Sign all inputs and outputs |
| SIGHASH_SINGLE | Sign all inputs and the output with the same index |
| SIGHASH_NONE | Sign all inputs and no output |
| SIGHASH_ALL | ANYONECANPAY | Sign its own input and all outputs |
| SIGHASH_SINGLE | ANYONECANPAY | Sign its own input and the output with the same index |
| SIGHASH_NONE | ANYONECANPAY | Sign its own input and no output |

When talking about malleability as a feature, one is looking for information in a transaction that is not signed by an ECDSA signature. Apart from inputs and outputs that could be excluded from the message to be signed, the content of the scriptSig is always excluded. This is because the scriptSig is designed to be the placeholder for the signature.

Definition 8: Blockchain time-locks. In general, there are two types of time-lock that can be used in transactions: absolute and relative time-locks. Absolute time-locks specify a specific point in time after which something can be considered 'valid' whereas relative time-locks specify a period that must elapse before something can be considered valid. In both cases, one can use either block height (number of blocks mined) or time elapsed (e.g. UNIX time) as the proxy for time when using blockchain time-locks.

Another property of blockchain time-locks is where they appear and to which aspect(s) of a transaction they apply. There are again, two classifications for time-locks in this sense: transaction-level, which lock entire transactions; and script-level, which lock specific outputs. Both of these time-lock levels can be used to implement either an absolute or relative time-lock. The table below summarises the four possible mechanisms for implementing time-locks that can be created based on these properties.

| | | Type | |
| --- | --- | --- | --- |
| | | Absolute | Relative |
| Level | Transaction Level | nLocktime | nSequence |
| | Script Level | OP_CLTV | OP_CSV |

Definition 9: nLocktime. The locktime (nLocktime) is a non-negative integer that represents the height of a block or a specific time in Unix time. It is a transaction-level time-lock in the sense that the transaction can only be added to the blockchain after the specified block or the specified time. If nLocktime is set to be less than 500,000,000, it is considered a block height. If it is set to be equal to or greater than 500,000,000, then it is considered as a representation of the Unix time. That is the number of seconds after 00: 00: 00 on the $1^{st}$ January 1970.

For example, if the current highest block is of height 3,000,000, and the locktime is set to be 4,000,000, then the transaction will not be considered by miners until the 4 millionth block is mined.

Definition 10: nSequence. The sequence number (nSequence) indicates the version of the transaction as a message. Any modification on the transaction will increment the sequence number to a larger one. The maximum value of nSequence is $2^{32}-1$ and, in general, the sequence number will be set to this maximum by default to indicate that the transaction is finalised. The nSequence value is defined for each input of a transaction and specifies the period of time after the UTXO referenced by the input was included in a block before it can be used as a valid input. If a miner sees two transactions with the same input, the miner will choose the transaction with the larger sequence number. However, this feature has been commonly disabled.

Definition 11: CheckLockTimeVerify (OP_CLTV). The opcode OP_CHECKLOCKTIMEVERIFY (OP_CLTV) is an absolute script-level time-lock that can be used to lock a specific output of a transaction to some specific time or block height in the future. If the current Unix time or block height, at which a UTXO is referenced in a transaction, is exceeded by the Unix time or block height at which the UTXO was created plus the parameter specified before the OP_CLTV opcode the script execution for the spending transaction will fail.

Definition 12: CheckSequenceVerify (OP_CSV). The opcode OP_CHECKSEQUENCEVERIFY (OP_CSV) is a relative script-level time-lock that can be used to lock a specific output of a transaction for a specific period of time or number of blocks into the future. This operates similarly to OP_CLTV, the difference being that the parameter provided to OP_CSV represents relative time. If the current Unix time or block height, at which a UTXO is referenced in a transaction, is exceeded by the parameter specified before the OP_CSV opcode the script execution for the spending transaction will fail.

Definition 13: Malleability. In general, there are two broad types of malleability that are possible in blockchain transactions, both of which allow the content of a transaction to be modified without invalidating the signature provided in an input.

To illustrate both cases, consider an initial transaction Tx which has one input, one signature in that input, and one output.

Type 1: Script-level malleability. This type of malleability takes advantage of the fact that a signature, which is to be checked with the script opcode OP_CHECKSIG, does not sign the script field of any input in a transaction. This fact allows us to generate a signature on a transaction Tx, modify the input script such that the transaction Tx' is non-identical to Tx, and still have both Tx and Tx' be considered valid transaction messages signed by the same signature under the blockchain consensus rules.

Type 2: Input and Output-level malleability. This type of malleability relies on the use of SIGHASH flags other than SIGHASH ALL being employed in a transaction. If a transaction Tx has an input signature that uses any of the five other SIGHASH flag combinations, then either an input(s) or output(s) can be added to create a non-identical transaction Tx', such that both will be considered valid transaction messages according to the consensus, without needing to alter the signature.

On-Chain Mechanism for Releasing Content to Users

The following describes an example mechanism for releasing content to a plurality of users based on inputs being added to a transaction by those users—a so-called crowdfunded transaction, but with an integrated, on-chain mechanism for releasing the content to the users once the crowdfunding target is reached. For instance this may be used as a new means of implementing multiparty streaming, whereby there is a new crowdfunded transaction for each portion or "chunk" of media data in the stream.

The media content is divided into M portions $D_1, D_2, \ldots D_M$, and M respective crowdfunded transactions are created (preferably all ahead of time) and hosted on a server accessible to multiple different users (e.g. the general public). Each of these transactions has an output specifying an amount of the digital asset to pay a vendor of the content (e.g. Bob) for the respective portion of media data. The locking script in the output of each transaction also comprises a piece of script requiring that, for a second transaction to redeem that output, an input of that second transaction must include a respective secret value Sm which acts as a key for releasing (e.g. decrypting) the respective portion of media content. Note, Sm is referred to as a secret only in that it is secret until it is published on the blockchain 150 as part of the second transaction, after which it is no longer secret.

For each portion m=1 ... M, each of N users access the crowdfunding transaction hosted on the server via a side channel 301 (i.e. off-chain), and malleates it by adding an input. This is done until the funding target is met; i.e. until the inputs point to a total amount sufficient to make up at least the output amount (otherwise the transaction will not be valid), and in practice to also cover a mining fee (otherwise the transaction will not get accepted by any miners 104M for mining even if it is technically valid).

The 'streaming' is then as simple as the vendor (e.g. Bob) broadcasting the secrets Sm to the P2P network 106 in spending transactions (one spending transaction to redeem the output of one crowd-funded transaction to in-turn reveal one secret Sm). In some embodiments the vendor Bob may separately send each secret to the users directly over the side channel 301, in addition to publishing on the blockchain 150. Or if he does not, possibly some or all of the users may also be peers of the P2P network (operating nodes 104), in which case they will also receive it in the spending transaction when Bob broadcasts it to the P2P network. Either of these can be done as fast as the information can be transmitted, so it should be fast. If neither is the case, the secret Sm will still end up on the blockchain 150 once the settlement transaction is mined into a block 151, and some or all of the users can retrieve it from there. Hence the vendor Bob cannot cheat by taking the payment but not releasing the secret key Sm.

This secret key Sm may be referred to herein as the "media key". It enables a user who obtains the key to unlock (i.e. access) a corresponding portion of media data content $D_m$ which is hosted on an off-chain data source 401. In embodiments the media key $S_m$ comprises at least a decryption key. In this case the user accesses the potion of media data by downloading it to his/her computer 102 and using the decryption key $S_m$ to decrypt it. There are at least two possible scenarios for the key $S_m$. Scenario one: $S_m$ may simply act as a single, common key directly enabling all users 103a to unlock the respective portion of content. I.e. once the fund is raised, the content is public for anyone who can access the P2P network 106 (But if no one contributes, then the content is not shown to anyone). However this may not be considered fair, since it would also enable any other member of the public to obtain the content even if they did not contribute to the funding.

Therefore in embodiments scenario 2 is used: $S_m$ is configured to enable each of the users to generate their own individual key $s_{m,1} \ldots s_{m,N}$, a respective one for each user n=1 ... N who contributed an input. In this case, to enable the the portion of content $D_m$ to a given user (e.g. to enable the user to decrypt that content) requires the user to apply their own individual key $s_{m,n}$, which they generated based on $S_m$ and some information personal to that user. The respective individual key $s_{m,n}$ is thus tied to the respective user and enables only that user to access (e.g. decrypt) the content $D_m$ in question. Examples for implementing this will be discussed later.

By adding a secret key ($S_m$) to the process, which is exposed when the output of the crowdfunded transaction is spent, this enables crowdfunding the on-chain revelation of a secret, rather than crowdfunding some off-chain process or event. This advantageously integrates the enabling of the crowd-funding outcome into an on-chain mechanism.

In some embodiments the disclosed process could be used to crowdfund and release just a single, stand-alone portion of content D. However, as discussed, it can also be used to release a sequence or stream of portions $D_m$, where m=1 ... M, each based on a respective corresponding crowdfunding transaction. An advantage of this is to add granularity to crowdfunding, and that the content can be partially crowd-funded one part at a time. E.g. so if a TV series is split into its episodes, the vendor (Bob) can ask people to crowdfund them, and reveal one episode as fast as they are crowdfunded. For instance this could be used by an over-the-top (OTT) video streaming service. The service advertises that they have the rights to a popular series, and that they will release each episode as soon as each has been crowdfunded by users. Users who actually pay into the crowdfunded transaction get early-access to the episode, for example.

The granularity means that one could even split each episode into smaller packages, e.g. second-by-second or however appropriate.

Similar techniques could also be applied to a number of other applications such as an online education or lecture series or radio show, by replacing a 'TV episode' with a lecture, etc.

An example implementation is now discussed in more detail with reference to FIGS. 4 to 6.

Figure 4:
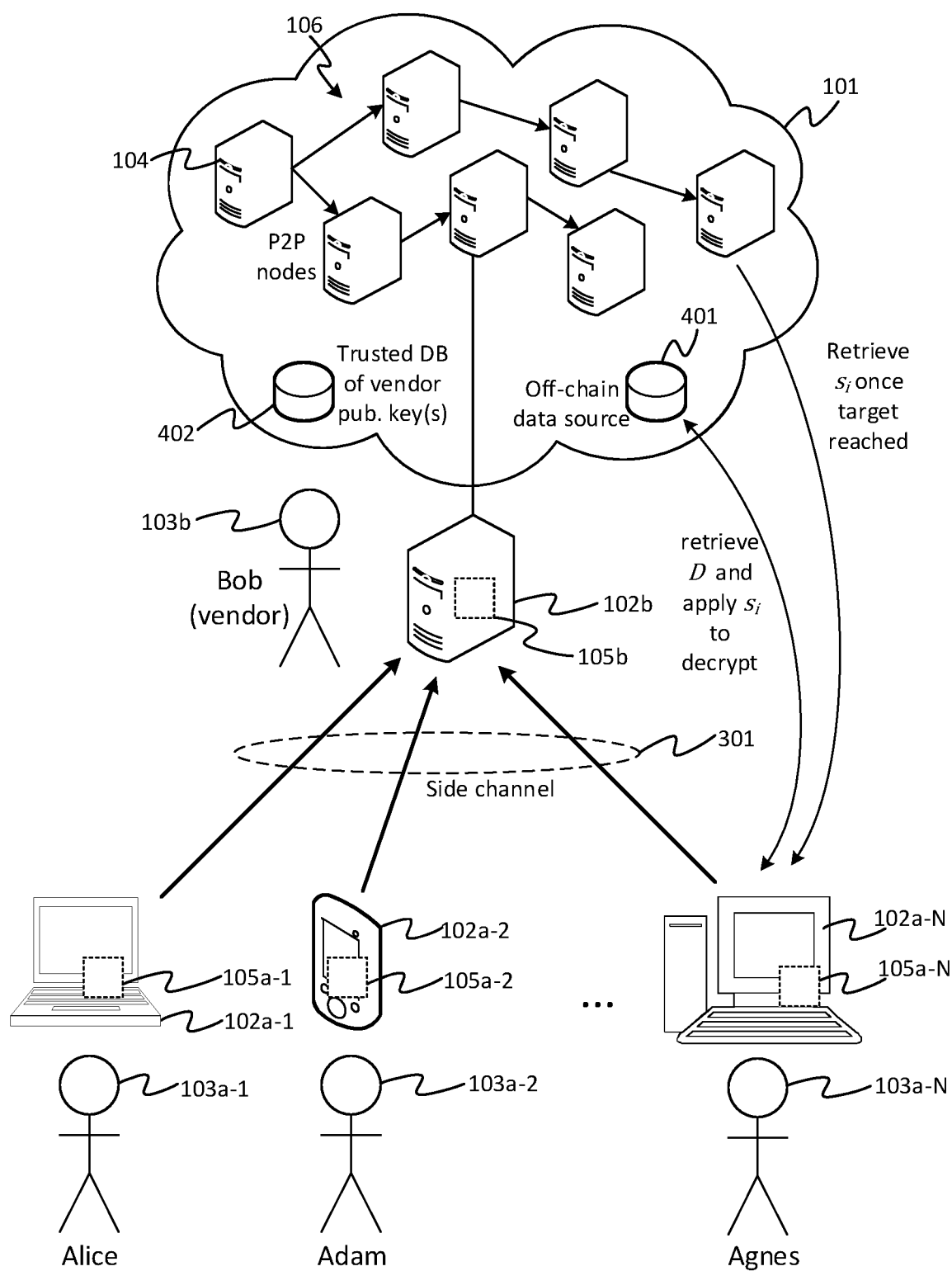
FIG. 4 is a schematic block diagram of a system for releasing crowdfunded content to multiple users via a blockchain.

FIG. 4 shows an extension to the arrangement of FIG. 3 whereby the respective computer equipment 102a-1, 102a-2, ..., 102a-N of a plurality of first users 103a-1, 103a-2, ... 103a-N is operable to connect to the computer equipment of Bob 103b via a side channel 301. By way of schematic illustration only, the first users are all given different names beginning with 'A' herein, e.g. Alice, Adam and Agnes. Anything discussed previously in relation to the equipment 102a and client 105a of the first party 102a may apply equally to any of the first users' equipment 102a-1, 102a-2, ..., 102a-N in the scenario of FIG. 4.

In this example scenario, Bob is acting in the role of a vendor of the media content. Bob's computer equipment 102b is configured in the role of a server. It may comprise resources of one or more dedicated server units at one or more geographic sites, or one or more user devices acting in the role of a server, or any combination of these. Bob's equipment 102b is also still installed with a client 105b of the P2P network 106, as is each of the first users' equipment 102a-1, 102a-2, ... 102a-N. Anything discussed previously in relation to Bob's equipment 102b and client 105b, and the side channel 301, may apply equally to the scenario of FIG. 4. Also, note again that the side channel 301 does not necessarily imply a single link or even a single access technology herein. Therefore in embodiments the side channel 301 discussed in relation to FIG. 4 may represent a bundle of links between Bob's equipment 103b and the equipment 103b-1, 103b-2, 103b-N of the different first users 102a, 102a-2, ..., 102a-N, using one or more types of access technology.

The system also comprises an off-chain data source 401 (i.e. a source for storing and making available to users 102a data that is not recorded on the blockchain 150). This is illustrated separately from Bob's equipment 102b in FIG. 4, but it could form part of Bob's equipment 102b. Alternatively it could indeed be separate from Bob's equipment 102b, e.g. Bob may be acting as a vendor on behalf of content hosted by a third party instead of by himself. Either way, the off-chain data source 401 stores each of the one or more portions of media data $D_m$ which are to be crowdfunded. The off-chain data source 401 is accessible via a network to the client software 105a-1, 105a-2, . . . 105a-N on each of the first parties' equipment 102a-1, 102a-2, 102a-N. The network via which it is made accessible may be the same network 101 (e.g. the internet) over which the P2P overlay network 106 is implemented, or a separate network such as a mobile cellular network or an intranet within an organization, etc., or any combination of these.

The following will be described in relation to an example where the content is divided into a plurality of portions (m=1 . . . M). However it will be appreciated that the same mechanism could be used to release even a single portion of data. Each portion of media data (content) may comprise a whole episode of a series of audio or video shows, or a portion of a given episode or stand-alone show (e.g. a movie). The granularity could even be reduced to the level of individual packages or packets of the show (e. g. per second or less) which are to be crowdfunded packet-by-packet.

Figure 6:
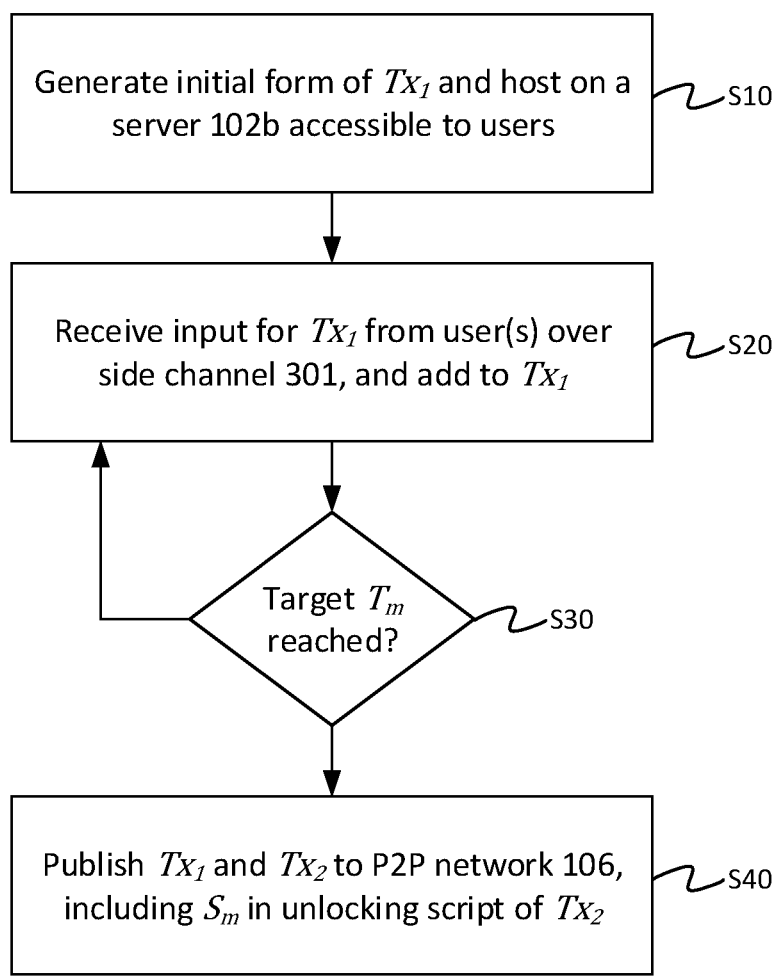
FIG. 6 is a flow chart showing a method of crowdfunding and releasing an item of media content to a plurality of users.

FIG. 6 illustrates a set of transactions 152 for use in accordance with embodiments disclosed herein. For each data portion $D_m$, the set includes a plurality of zeroth transactions $Tx_0$, a first transaction $Tx_{1-m}$ and a second transaction $Tx_{2-m}$. Note that these names are just convenient labels. They do not necessarily imply that these transactions will be placed immediately one after another in a block 151 or the blockchain 150, nor that a zeroth transaction is the initial transaction in a block 151 or the blockchain 150. Nor do these labels necessarily imply anything about the order their transactions are sent to the network 106. They refer only to a logical series in that the output of one transaction is pointed to by the input of the next transaction. Remember that in some systems it is possible to send a parent to the network 106 after its child (in which case the "orphan" child will be buffered for a period at one or more nodes 104 while waiting for the parent to arrive).

Each zeroth transaction $Tx_0$ may also be referred to as a source transaction for the present purposes, in that it acts as a source of an amount of the digital asset for the first transaction. The first transaction $Tx_{1-m}$ may also be referred to as the crowdfunding transaction for the present purposes. It acts as an intermediary for conditionally transferring the amount of digital asset from the source transactions $Tx_0$ to fund the release of the portion of media data $D_m$. The second transaction $Tx_{2-m}$ may also be referred to as the spending transaction, or target transaction, as it is the transaction that will unlock the condition in the first transaction and deliver the payment for the vendor Bob (or potentially a beneficiary on behalf of whom Bob is acting).

As shown in FIG. 6, each zeroth or source transaction $Tx_0$ comprises at least one output $203_0$ (e.g. output 0 in the Figure) which specifies an amount of the digital asset, and which further comprises a locking script locking this output to a user such as Alice 103a or Adam 103b, etc. This means that the locking script of the source transaction $Tx_0$ requires a condition to be met, which is that the input of any transaction attempting to unlock the output (and therefore redeem the amount of the digital asset) must include a cryptographic signature of the user to whom it is locked in its unlocking script, the signature having been generated using the public key of that user. In this sense the amount defined in the output of $Tx_0$ may be said to be owned by that user, e.g. Alice or Adam etc. The output may be referred to as a UTXO. It is not particularly material for the present purposes which output of which preceding transaction the inputs of the source transactions $Tx_0$ point back to (as long as they are sufficient to cover the total output(s) of the source transactions $Tx_0$).

In the present case the transaction unlocking the output of the source transaction $Tx_0$ is the first, or crowdfunding, transaction $Tx_{1-m}$ for data portion $D_m$. Therefore the finalized instance of $Tx_{1-m}$ will have at a plurality of inputs $202_1$, each comprising a pointer to a respective output of a respective one of the source transactions $Tx_0$. Each output of $Tx_{1-m}$ further comprises an unlocking script configured to unlock the pointed-to output of the respective $Tx_0$ according to the condition defined in the locking script of that output, which requires at least a signature of the respective user. The signature required by the locking script of $Tx_0$ is required to sign some part of $Tx_{1-m}$. In some protocols the part of $Tx_{1-m}$ that needs to be signed can be a setting defined in the unlocking script of $Tx_{1-m}$. E.g. this may be set by the SIGHASH flag, which is one byte that is appended to the signature, so in terms of data the unlocking script appears as: <Sig $P_A$><sighashflag> <$P_A$>. Alternatively the part that needs to be signed could simply be a fixed part of $Tx_{1-m}$. Either way, the part to be signed typically excludes the unlocking script itself, and may exclude some or all of the inputs of $Tx_{1-m}$. This means the inputs of $Tx_{1-m}$ are malleable, which allows users to add inputs $202_1$.

The first or intermediary transaction $Tx_{1-m}$ has at least one output $203_1$ (e.g. output 0 of $Tx_{1-m}$ in the Figure, where again the output may be referred to as a UTXO). This output specifies an amount of digital asset to be transferred onwards, and which further comprises a locking script defining a condition required to unlock that output and hence redeem this amount. This condition requires that the unlocking script of whichever transaction is attempting to unlock $Tx_{1-m}$—in this case the second transaction $Tx_{2-m}$—includes in its unlocking script a cryptographic signature of Bob and a payload which Bob will have to include. As will be discussed in more detail shortly, this payload comprises a secret key $S_m$ which will enable the users 103a-1 . . . 103a-N to release the piece of content $D_m$. The requirement to include the payload can be imposed by a hash challenge included in the locking script of $Tx_{1-m}$. The challenge comprises a hash of the payload (not the payload itself), along with a piece of script configured so as (when run on a node 104 together with the unlocking script) to test whether a hash of the payload provided in the corresponding unlocking script equals the hash value provided in the locking script. The requirement for a signature can be imposed for example by the CheckSig discussed previously. In embodiments the first condition does not require Alice's signature to be included in the unlocking script of $Tx_{2-m}$. The part of $Tx_{2-m}$ that needs to be signed by Bob may be a setting of the unlocking script of $Tx_{2-m}$ (e.g. specified by the SIGHASH flag), or could be fixed. Either way, it typically excludes at least the unlocking script.

The second, target transaction $Tx_{2-m}$ has at least one input $202_2$ (e.g. input 0 of $Tx_{2-m}$) which comprises a pointer to the above-mentioned output of $Tx_{1-m}$ (output 0 of $Tx_{1-m}$, in the example shown), and which also comprises an unlocking script configured to unlock said output of $Tx_{1-m}$ based on meeting the condition defined in the locking script of $Tx_{1-m}$. The second transaction $Tx_{2-m}$ has at least one output $203_2$ (e.g. output 0 of $Tx_{2-m}$) which specifies an amount of the digital asset to transfer to Bob. The output $203_2$ also comprises a locking script locking this to Bob (i.e. it would require a further, onward transaction including Bob's signature in the unlocking script to spend). In this sense the output of the target transaction $Tx_{2-m}$ can be said to be owned by Bob. This output may again be referred to as a UTXO.

Figure 5:
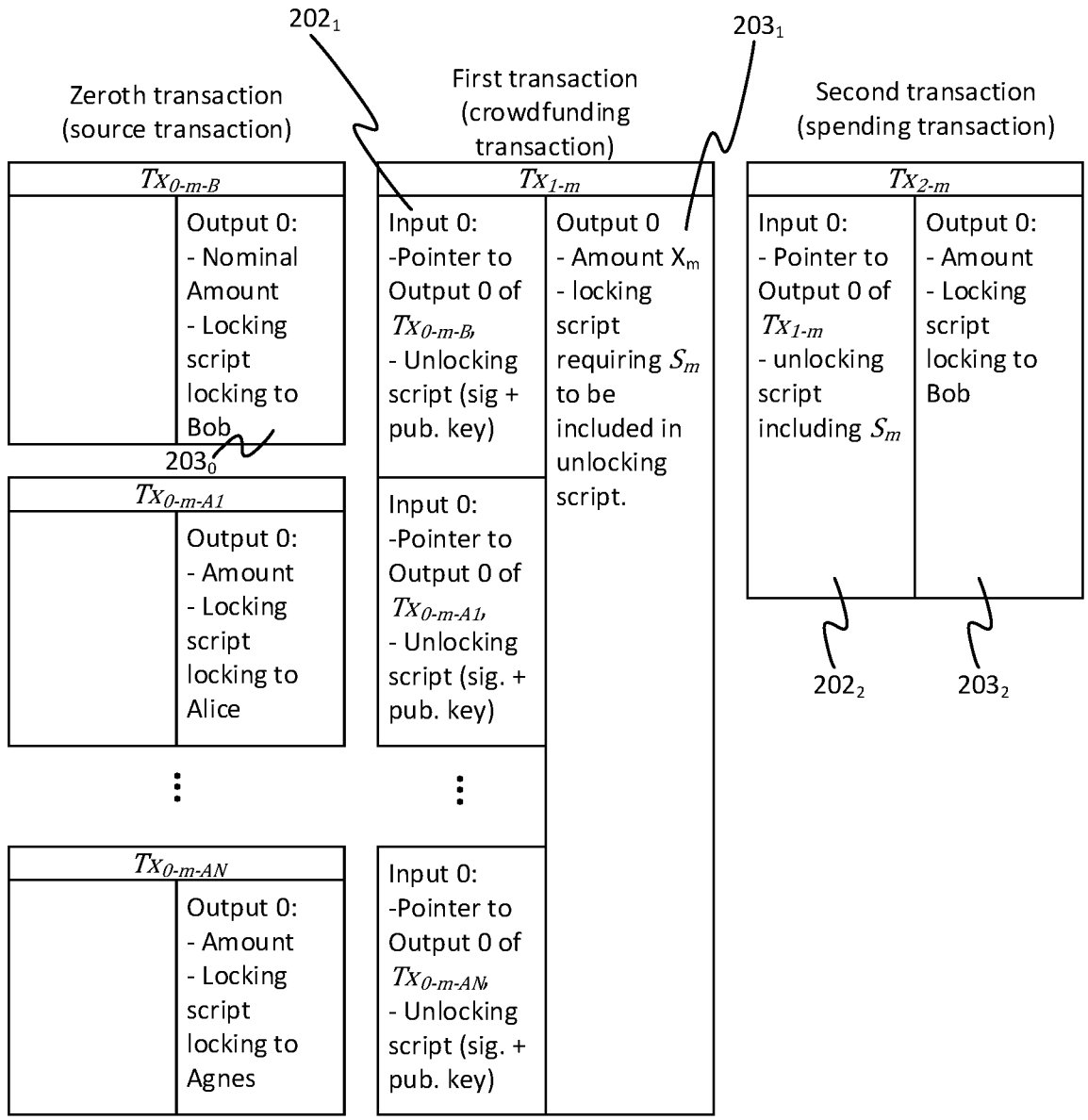
FIG. 5 is a schematic illustration of a set of transactions.

FIG. 6 shows a method for using a set of transactions such as those described in relation to FIG. 5 to crowdfund and release an item of data $D_m$ to a plurality of users 103a-1 . . . 103a-N. The method is described from the perspective of the vendor, Bob, 103b. It may be performed by the software 105b running on Bob's equipment 102b. It will be appreciated that according to another aspect there is provided a corresponding method performed from the perspective of a user 103a such as Alice 103a-1, by the client application 105a run on that user's equipment 102a. It will also be appreciated that phrases such as "by Alice [or a user]", "by Bob [or the vendor]" and "by a third party" herein may be used as a short-hand for "by the software 105a run on the computer equipment 102a of the user 103a", "by the software 105b run on the computer equipment 102b of the vendor 103b", and "by software run on the computer equipment of a third party", respectively. Also, note again that the equipment of a given party could comprise one or more user devices used by that party, or server resources such as cloud resources employed by that party, or any combination of these. It does not necessarily limit the actions to being performed on a single user device or at a single physical location.

At step S10 the vendor (Bob) formulates an initial template version of $Tx_{1-m}$ and hosts it on a server of his equipment 102b, thus making $Tx_{1-m}$ available for any of the users 103a-1 . . . 103a-N to malleate via the side channel 301. As mentioned, the server of the vendor Bob may comprise any serving computer equipment acting in the role of a server, and may comprise one or more dedicated server units (or resources thereof) and/or one or more user devices located at one or more geographic sites. It may be made accessible to the equipment 103a-1 . . . 103a-N of the users 102a-1 . . . 102a-N via the same network 101 (e.g. the Internet) over which the P2P overlay network is implemented, or a separate network (e.g. a mobile cellular network or an internal intranet within an organization), or any combination of these.

In embodiments Bob may formulate and store the initial template forms of the crowdfunding transaction $Tx_{1-m}$, where m=1 . . . M, for all the portions of media data $D_m$ in advance of releasing or even receiving funding for the first portion in the sequence. However for simplicity the following method is described for a given one of the portions of the media data $D_m$ and its corresponding crowdfunding transaction $Tx_{1-m}$. Note also, in alternative embodiments it is possible that one, some or all of the crowdfunding transactions $Tx_{1-m}$ are formulated for Bob by a third party and provided to him to host on his serving equipment 102b. The following will be described in terms of Bob formulating each crowdfunding transaction (i.e. first transaction) $Tx_{1-m}$ himself, but it will be appreciated this is not limiting. Further, it will be appreciated that the vendor "Bob" may in fact be an organization comprising more than one person, rather than an individual user.

$Tx_{1-m}$ as initially formed by the vendor Bob comprises at least one output $203_k$. This comprises a value $X_m$ specifying the amount of the digital asset that he wishes to receive in order to release the respective portion of media content $D_m$. $X_m$ could be the same for all m (i.e. all portions of the media $D_m$), or it could differ between some or all of the portions $D_m$. Bob also stores on his equipment 102b a target value $T_m$ required to release the respective portion of media data $D_m$. $T_m$ could equal $X_m$ in a system that did not require mining fees (e.g. a consortium blockchain system). Alternatively $T_m=X_m+M$, where M is a mining fee. The mining fee M could be a function of time t depending on current prices, or it could be fixed (e.g. set at a high enough margin that it is likely to cover any reasonable mining fee fluctuation over the period over which the funding from the users 103a-a . . . 103a-N is expected).

The output $202_1$ of $Tx_{1-m}$ also includes a locking script. The locking script requires the unlocking script of the transaction attempting to redeem the output $202_1$—in this case $Tx_{2-m}$—to include the secret access key $S_m$ (the media key) for the respective portion of media content $D_m$. As mentioned, this requirement may be implemented by a hash challenge. I.e. the locking script includes a hash of a payload comprising the media key and piece of script configured to: hash the value of the payload included in the unlocking script, compare this with the value of the hash in the locking script, and unlock the output on condition that they match.

In embodiments, the vendor Bob includes an input $202_1$ of his own in the version of $Tx_{1-m}$ initially formed by Bob. This input points to an output of a respective source transaction $Tx_{0-m-B}$ locked to Bob. The amount of digital asset specified in this output may be zero or a nominal (negligible) amount (e.g. if the protocol does not allow a zero amount in a spendable output). The locking script of the output of $Tx_{0-m-B}$ requires a signature of Bob to be included in the unlocking script in an input of the transaction unlocking it, in this case Bob's input of $Tx_{1-m}$. Hence Bob's input in $Tx_{1-m}$ comprises an unlocking script including Bob's signature signing a part of $Tx_{1-m}$, and also Bob's public key to enable the verification of his signature.

The purpose of this input of $Tx_{1-m}$ may be to provide a way for the vendor Bob to sign the transaction and thus signal his endorsement of the transaction. And/or, the crowdfunding transaction $Tx_{1-m}$ should preferably have at least one initial input to secure (sign) the output 203i. Without any input, the output is loose: anyone can replace the output. But as soon as there is at least one input $202_1$ signing the output $203_1$, the output cannot be changed anymore.

Furthermore, in embodiments, the vendor Bob's input to $Tx_{1-m}$ also provides a way for one or more of the users 103a-1, . . . 103a-N to verify the authenticity of the transaction before adding their own inputs $202_1$ to fund it. For instance, the system may comprise a database 402 of a trusted third party, made accessible to one, some or all of the users' equipment 102a-1, . . . 102a-N. It may be made accessible via the same network (e.g. the Internet) 101 over which the P2P overlay network 106 is implemented, or a separate network such as a mobile cellular network or intranet, etc., or any combination of these. The database 402 comprises a list of the public key(s) of one or more vendors endorsed by the trusted third party. Thus by accessing the database 402 and observing Bob's public key listed there (i.e. checking for a value matching the public key as found in Bob's input to $Tx_{1-m}$), then they can have confidence that Bob is a legitimate vendor.

However, the vendor Bob's input is optional. Alternatively, $Tx_{1-m}$ as initially formed by Bob does not include any inputs 2021.

At step S20, the vendor Bob begins to receive inputs from one or more users $103a$-1 ... $103a$-N. Each such user $103a$ accesses the current version of the crowdfunding transaction $Tx_{1-m}$ on Bob's server $102b$ via the side channel 301, and thereby malleates this transaction to add a respective input $202_1$ of her own. The input added by each of these users $103a$-$n$ points to an output of a respective source transaction $Tx_{0-m-n}$, which specifies an amount of the digital asset locked to that user $103a$-$n$ and comprises a locking script locking the respective output to that user. I.e. the locking script of $Tx_{0-m-n}$ requires that the unlocking script of the respective input of the transaction unlocking it—in this case $Tx_{1-m}$—includes the signature of the respective user $103a$-$n$. Hence the user's input to $Tx_{1-m}$ comprises an unlocking script including that user's signature signing a part of $Tx_{1-m}$, and also the user's public key to enable the verification of her signature.

After receiving one or more inputs from one or more users $103a$, then at step S30 the vendor Bob checks whether $Tx_{1-m}$ now has sufficient inputs to meet his target $T_m$. I.e. he adds up the amounts in the outputs $203o$ of the source transactions $Tx_{0-m}$ pointed to by the input(s) received so far, and checks whether they are at least equal to the target amount $T_m$. If not the method loops back and continues from step S20.

Once the amounts pointed to by the inputs of $Tx_{0-m}$ do at least add up to the target $T_m$, the vendor Bob proceeds to step S40 where he publishes $Tx_{1-m}$ and the corresponding spending transaction $Tx_{2-m}$ to network 106 to the P2P network 106. That is, he sends each of $Tx_{1-m}$ and $Tx_{2-m}$ to at least one of the forwarding nodes 104F to be propagated from there throughout the network 106; each of these transactions being validated at each node 104, mined into a block 151 by one of the mining nodes 104M, and recorded in the copy of the blockchain 150 maintained at each storage node 104S. Alternatively he could send one or both of these transactions $Tx_{1-m}$ and $Tx_{2-m}$ to one of the users $103a$ or a third party for them to forward onward to the network 106. Either way, the vendor Bob has thus caused both transactions to be propagated through the nodes 104 of the network 106 and recorded publicly in the blockchain 150.

The output $203_1$ of the crowdfunding transaction $Tx_{1-m}$ specifies the payment $X_m$ to Bob for the data portion $D_m$, and also comprises a locking script. The spending transaction $Tx_{2-m}$ comprises an input $202_2$ pointing to the output of $Tx_{1-m}$ and comprising a locking script. $Tx_{2-m}$ comprises an output $203_2$ specifying an amount of the digital asset and comprising a locking script locking this amount to Bob.

The locking script in the output of $Tx_{1-m}$ requires that the unlocking script of the transaction unlocking it—in this case $Tx_{2-m}$—includes a specified payload. E.g. this requirement may be imposed by a hash challenge in the locking script, as discussed previously. This payload comprises a media key (e.g. decryption key) $S_m$ for enabling the users $103a$-1, ..., $103a$-N to access (e.g. decrypt) the corresponding portion of media content $D_m$ from the off-chain data source 401. Because the spending transaction $Tx_{2-m}$ must include $S_m$ in order for the vendor Bob to claim his payment, this means it must be made publicly visible on the blockchain 150 when Bob claims the payment.

Each user $103a$-1, ..., $103a$-N can thus inspect the blockchain 150 to retrieve the media key $S_m$. They can then use the media key $S_m$ to obtain and consume the respective media data portion $D_m$ from the off-chain data source 401.

In some cases the vendor Bob could optionally, in addition to publishing it on the blockchain 150, send the media key $S_m$ to one, more or all of the users $103a$ via the side channel 301. And/or, if one or more of the users $103a$ is also a peer 104 of the P2P network 106, then they will receive $S_m$ when the spending transaction $Tx_{2-m}$ is propagated through the network 106, potentially before it is mined. As another possibility, in the future APIs may be made available enabling users to query the pools 154 of mining nodes 104M, thus enabling users to observe the data in pending transactions before they are mined. But by whatever medium the users $103a$ receive it, the point is that the vendor Bob cannot prevent the media key $S_m$ from being made available to the users $103a$ by at least one channel (the blockchain 150). Thus Bob cannot cheat by taking the payment but not releasing the corresponding media content.

In embodiments the media key $S_m$ comprises at least decryption key. In this case the user $103a$ queries the off-chain data source 401 to download the portion of media data $D_m$ to his/her respective computer equipment $102a$, and then applies the decryption key to decrypt the media data portion $D_m$ and thus obtain a (clear) copy of the data on their respective computer equipment $102a$. Alternatively or additionally, the media key $S_m$ could comprise a passcode required to download the portion of media data $D_m$ in the first place. In this case the user submits the passcode $S_m$ to the off-chain data source 401, and in response is allowed to download or stream the media data portion $D_m$ to his/her respective computer equipment $102a$. In some embodiments the media key $S_m$ may comprise both an encryption key and a passcode, and the access may combine both approaches.

Some embodiments could use just one single passcode or generic decryption key that allows everyone to access the data somewhere else. This would be straightforward to implement but may be undesirable as it may allow unpaid users to access the data too if the code is leaked. A more secure option therefore is to use an approach based on a single public key of a group-based public-key encryption scheme (where this public key can be generated using any chosen group-based public-key encryption scheme, preferably ECDSA). Contributors will have already provided their public key in their inputs, say, $PK_i$. The organiser creates a private key V, and calculates $S_m$=V·G, and $S_{m,i}$=V·$PK_i$. $S_i$ is the shared secret between the organiser and contributor i. The value can be hashed to create a secret key for symmetric encryption scheme. The organiser uses the shared secret to encrypt the data for each contributor i. This encrypted data is communicated off-chain preferably. As of now, no contributor would be able to decrypt the data.

In the unlocking script, the organiser then publishes $S_m$. Each contributor then will be able to calculate the shared secret using their own private key, and derive the decryption key if needed. The downside of this is that the public have to trust whatever in the locking script (could be hash of $S_m$) will indeed force the organiser to disclose $S_m$. This may be fine for well-known OTT providers, for example. Also, in embodiments the scheme can be combined with the trusted database 402 for added trust.

Thus in embodiments, to access the portion of media data $D_m$, each user $103a$-$n$ is required to use a respective individual media key (e.g. decryption key) $s_{m,n}$ tied to that specific user. In this case, the vendor Bob computes the media key $S_m$ included in $Tx_{1-m}$ based on the public key of each user $103a$-$n$ included in their respective inputs $202_1$ to $Tx_{1-m}$. When each user $103a$-$n$ receives $S_m$, they compute their own individual media key $s_{m,n}$ and use this to access the corresponding portion of media content $D_m$ from the off-chain source 401. The individual media key for each user is unique to that user (where "unique" herein means at least to the extent that the chance of a collision is vanishingly small).

This may be implemented by using one of various available key-sharing techniques which in themselves are known in the art. Each contributing user 103a-1, ..., 103a-N will reveal their respective public key in their input of $Tx_{i-m}$. The vendor Bob can use that public key together with a key-sharing technique in order to create a shared secret with each contributor. Bob can then encrypt the portion of media data $D_m$ using the shared secret as a symmetric encryption key, and cause it to be sent to the targeted audience (the contributing users 103a-1, ..., 103a-N). This could comprise sending it himself if the data source 401 is implemented on the vendor Bob's equipment 102b, or triggering it to be sent from a third party if the data source 401 is implemented elsewhere. Either way, effectively each contributor 103a-n will receive a customised encrypted version of the portion of media data content $D_m$. When Bob reveals $S_m$ on-chain, each individual 103a-n will be able to derive the shared secret $s_m n$. Note that each will have a different shared secret ("shared" here means shared between the vendor Bob and the respective user 103a-n, not shared between the different users 103a-1, ..., 102a-N). As long as the public key used in the input is unique, then the individual shared key is unique.

An example implementation is as follows, which is based on a standard Diffie Hellman key exchange:
I. Alice contributes and provides her public key in her input, PK_A;
II. in the locking script there is a hash check: H(PK_B), i.e. to unlock it Bob has to reveal PK_B;
III. Bob calculates $(sk_B \cdot PK_A)$, and uses it as a symmetric encryption key to encrypt the data just for Alice; and
IV. once Bob reveals PK_B, Alice will be able to calculate the same symmetric key by calculating $(sk_A \cdot PK_B)$;
  and similarly for the other contributing users Adam, Agnes, etc. Note that this is just one of a number of possible implementations implemented using standard key sharing techniques.

As an example scenario, suppose Bob would like to broadcast a video. This could be a lecture, a tutorial, or an event in general.

In this scenario, it may be assumed Bob knows exactly what time he would like to start to broadcast. He also has a pre-determined price for his broadcasting. The video data will be encrypted chunk-by-chunk and transmitted off-chain. A partial secret value $s_m$ will be generated by Bob and exchanged on-chain for each chunk.

Participants will then derive a full secret key to decrypt the data.
Initialisation of the payment channel—$Tx_{1-m}$
Locktime: 60
Input 0:
  Bob's own UXTO with small value
  Bob's signature and SIGHASH_SINGLE|ANYONECANPAY
Output 0:
  Locking conditions:
    If Bob provides $s_m$ and his signature, he can claim the output.
  Value: 100,000 units
Alice joins the channel—$TX_{1-m-A1}$
Locktime: 60
Input 0:
  Bob's own UXTO with small value
  Bob's signature and SIGHASH_SINGLE|ANYONECANPAY
Input 1:
  Alice's UTXO
  Alice's signature and SIGHASH_ALL|ANYONECANPAY
Output 0:
  Locking conditions:
    If Bob provides $s_m$ and his signature, he can claim the output.
  Value: 100,000 units
Adam joins the channel after Alice—$TX_{1-m-A1-A2}$
Locktime: 60
Input 0:
  Bob's own UXTO with small value
  Bob's signature and SIGHASH_SINGLE|ANYONECANPAY
Input 1:
  Alice's UTXO
  Alice's signature and SIGHASH_ALL|ANYONECANPAY
Input 2:
  Adam's UTXO
  Adam's signature and SIGHASH_ALL|ANYONECANPAY
Output 0:
  Locking conditions:
    If Bob provides $s_m$ and his signature, he can claim the output.
  Value: 100,000 units This process can go on until the value of the input covers the value of the output or the timelock expires.

It could be possible for Bob to cheat by false advertisement of his event. However, it may be required that there is a publicly verifiable source that links an event with a public key. The public key could be the ECDSA public key that is required in Input 0 in $TX_1$. Therefore, interested participants can tell whether $TX_1$ is genuine.

If there are not enough inputs and Bob still wants to go ahead, he can fill in the price gap himself.

If there is more interest than that Bob has anticipated, Bob can either create another transaction or allow participants to copy the output from $TX_1$ and create a new transaction themselves.

Each participant 103a is identified with their public key in their input $202_1$. The public key will be used to calculate the customised secret key to encrypt data. When Charlie reveals $s_m$, participants will be able to compute the secret key to decrypt the data $D_m$ they have received.

To continue viewing the content, participants 103a just follow the subsequent transactions and fill in the inputs $202_1$.

As shown above, for security reasons, the output must be locked by signatures such as ECDSA signatures. As a result, no one would be able to modify the output. That is, neither Bob nor Alice (nor any other user) would be able to add their change address to the output. Therefore, Alice or Bob has to make sure that their UXTOs provide the exact amount they wish to pay.

It will be appreciated that the above embodiments have been described by way of example only. More generally, there may be provided a method, program, apparatus or a set of transactions in accordance with any of the following Statements. It will be appreciated that all but the independent Statements define optional features.

Statement 1: according to one aspect disclosed herein, there is provided a computer-implemented method of enabling a plurality of users to access an item of media content; the method comprising, by a vendor of the media content: providing a first transaction comprising i) one or more outputs including at least a first output specifying an amount of a digital asset to transfer to the vendor, and ii)

initially, a total of zero or more inputs wherein a total input amount of the digital asset specified in any outputs of any source transactions pointed to by the zero or more inputs is less than a total output amount of the digital asset specified by the one or more outputs, and wherein the first output of the first transaction comprises a locking script specifying a condition to be met by an unlocking script to unlock said first output; over a side channel, receiving an input from each of said plurality of users, and adding each received input to the first transaction, each received input pointing to an output of a respective source transaction specifying an amount of the digital asset; and once a target is reached, whereby a total input amount pointed to by the inputs of the first transaction is equal to or exceeds the output amount, causing the first transaction and a second transaction to be published to a blockchain network to be recorded in a blockchain, wherein the second transaction comprises an input pointing to the first output of the first transaction and comprising the unlocking script meeting said condition; wherein the condition specified by the locking script requires the unlocking script to include a media key enabling the users to access the item of media content.

Statement 2: in embodiments, there may be provided the method of Statement 1, wherein the target comprises: the total input amount exceeding the total output amount by at least enough of a mining fee to have the first transaction accepted by a miner for mining into a block.

Statement 3: in embodiments, there may be provided the method of Statement 1 or 2, comprising repeating said method for each of a plurality of items of data, wherein each item of content forms a different respective one of a sequence of portions of media content.

Statement 4: in embodiments, there may be provided the method of Statement 3, wherein the portions are packets of a given episode or stand-alone show or movie streamed to the users in real-time.

Statement 5: in embodiments, there may be provided the method of Statement 3, wherein the portions are different episodes of a series.

Statement 6: in embodiments, there may be provided the method of any preceding Statement, wherein an indication linked to the first transaction is listed in a database operated by a third party independent of the vendor and users, thereby enabling the users to verify that the first transaction is a legitimate medium for obtaining the media key.

Statement 7: in embodiments, there may be provided the method of any preceding Statement, wherein the zero or more initial inputs comprise at least one initial input included by the vendor comprising an unlocking script to unlock an output of a respective source transaction, the unlocking script in said input of the vendor including a public key of the vendor and a signature of the vendor formed using a private key of the vendor corresponding to said public key.

Statement 8: in embodiments, there may be provided the method of Statement 6 and 7, wherein said indication comprises a copy of the public key of the content provider, thereby enabling the users to perform said verification by comparing the public key in the unlocking script of the initial input of the vendor with the copy of the public key held in the database.

Statement 9: in embodiments, there may be provided the method of any preceding Statement, comprising, after receiving multiple of the inputs from the users but still not enough to reach the target, the vendor adding a further input to make up at least the difference.

Statement 10: in embodiments, there may be provided the method of any preceding Statement, comprising: in response to receiving excess inputs from users pointing to more amounts of the digital asset than required to meet the target: creating a new instance of the first transaction and adding the excess inputs to the new instance of the first transaction.

Statement 11: in embodiments, there may be provided the method of any preceding Statement, wherein the media key comprises a decryption key, enabling the users to perform said accessing of the item of media content at least by decrypting it using the decryption key.

Statement 12: in embodiments, there may be provided the method of any preceding Statement, wherein the media key is configured to enable an individual media key to be computed by each of the plurality of users, thereby enabling only the users who provided inputs to access the item of media content.

Statement 13: in embodiments, there may be provided the method of Statement 11 and 12, wherein each individual media key comprises an individual decryption key.

Statement 14: in embodiments, there may be provided the method of any preceding Statement, wherein: each of the users' inputs comprises a respective unlocking script to unlock an output of the respective source transaction, the respective unlocking script including a respective public key of the user and a respective signature of the user formed using a private key of the user.

Statement 15: in embodiments, there may be provided the method of Statement 14, as dependent on Statement 12 or 13, wherein the individual media key of each user is generated based on the respective public key of the user taken from the input received from that user.

Statement 16: according to another aspect disclosed herein, there is provided a computer program embodied on computer-readable storage and configured so as when run on computer equipment of the vendor to perform the method of one of Statements 1 to 15.

Statement 17: according to another aspect disclosed herein, there is provided computer equipment of the vendor, comprising: memory comprising one or more memory units, and processing apparatus comprising one or more processing units; wherein the memory stores code arranged to run on the processing apparatus, the code being configured so as when on the processing apparatus to carry out the method of one of Statements 1 to 15.

Statement 18: according to another aspect disclosed herein, there is provided a method of accessing an item of media content made available in an off-chain data source; the method comprising, by a user: accessing a server of a vendor hosting a first transaction comprising i) one or more outputs including at least a first output specifying an amount of a digital asset to transfer to the vendor, and ii) initially, a total of zero or more inputs wherein a total input amount of the digital asset specified in any outputs of any source transactions pointed to by the zero or more inputs is less than a total output amount of the digital asset specified by the one or more outputs, and wherein the first output of the first transaction comprises a locking script specifying a condition to be met by an unlocking script to unlock said first output; and over a side channel to the server, sending at least one input amongst a plurality of inputs sent by a plurality of users to be added to the first transaction, each input pointing to an output of a respective source transaction specifying an amount of the digital asset, thereby enabling the vendor, once a target is reached whereby a total input amount pointed to by the inputs of the first transaction is equal to or exceeds the output amount, to have the first transaction and a second transaction published to a blockchain network to be recorded in a blockchain, wherein the second transaction comprises an input pointing to the first output of the first transaction and comprising the unlocking script meeting said condition; wherein the condition specified by the locking script requires the unlocking script to include a media key; and wherein the method further comprises using the media key to unlock the item of media content.

Statement 19: according to another aspect disclosed herein, there is provided a computer program embodied on computer-readable storage and configured so as when run on computer equipment of the user to perform the method of Statement 18.

Statement 20: according to another aspect disclosed herein, there is provided computer equipment of the user, comprising: memory comprising one or more memory units, and processing apparatus comprising one or more processing units; wherein the memory stores code arranged to run on the processing apparatus, the code being configured so as when on the processing apparatus to carry out the method of Statement 18.

Statement 21: according to another aspect disclosed herein, there is provided a set of transactions for recordal in a blockchain, the set comprising, embodied on a computer-readable data medium or media: a first transaction comprising i) one or more outputs including at least a first output specifying an amount of a digital asset to transfer to the vendor, and ii) a plurality of inputs from a plurality of different users, each input pointing to an output of a respective source transaction specifying an amount of the digital asset, wherein a total input amount of a digital asset pointed to by the inputs of the first transaction is equal to or exceeds a total output amount specified by the one or more outputs, and wherein the first output of the first transaction comprises a locking script specifying a condition to be met by an unlocking script to unlock said first output; and a second transaction comprising an input pointing to the first output of the first transaction, the input of the second transaction comprising the unlocking script meeting said condition, wherein the condition specified by the locking script requires the unlocking script to include a media key enabling access to an item of media content stored in an off-chain data source.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of enabling a plurality of users to access an item of media content; the method comprising, by a vendor of the media content:
   encrypting the item of media content such that the item of media content may be decrypted and accessed by the plurality of users using a media key;
   hashing a payload comprising the media key;
   storing the encrypted item of media content in an off-chain data source;
   storing on a server accessible to the plurality of users a first transaction comprising i) one or more outputs including at least a first output specifying an amount of a digital asset to transfer to the vendor, and ii) initially, a total of zero or more inputs wherein a total input amount of the digital asset specified in any outputs of any source transactions pointed to by the zero or more inputs is less than a total output amount of the digital asset specified by the one or more outputs, wherein the first output of the first transaction comprises a locking script specifying a condition to be met by an unlocking script to unlock said first output, and wherein the locking script comprises the hashed payload;
   over a side channel, wherein the side channel is a packet-switched network, receiving an input from each of said plurality of users, and adding each received input to the first transaction, each received input pointing to an output of a respective source transaction specifying an amount of the digital asset; and
   once a target is reached, whereby a total input amount pointed to by the inputs of the first transaction is equal to or exceeds the total output amount, causing the first transaction and a second transaction to be published to a blockchain network to be recorded in a blockchain stored on a server that is part of a peer-to-peer network, wherein the second transaction comprises an input pointing to the first output of the first transaction and comprising the unlocking script meeting said condition;
   wherein the condition specified by the locking script requires the unlocking script to include the media key enabling the users to decrypt and access the item of media content.

2. The method of claim 1, wherein the target comprises: the total input amount exceeding the total output amount by at least enough of a mining fee to have the first transaction accepted by a miner for mining into a block.

3. The method of claim 1, comprising repeating said method for each of a plurality of items of data, wherein each item of content forms a different respective one of a sequence of portions of media content.

4. The method of claim 3, wherein the portions are packets of a given episode or stand-alone show or movie streamed to the users in real-time.

5. The method of claim 3, wherein the portions are different episodes of a series.

6. The method of claim 1, wherein an indication linked to the first transaction is listed in a database operated by a third party independent of the vendor and users, thereby enabling the users to verify that the first transaction is a legitimate medium for obtaining the media key.

7. The method of claim 1, wherein the zero or more initial inputs comprise at least one initial input included by the vendor comprising an unlocking script to unlock an output of a respective source transaction, the unlocking script in said input of the vendor including a public key of the vendor and a signature of the vendor formed using a private key of the vendor corresponding to said public key.

8. The method of claim 7, wherein: an indication linked to the first transaction is listed in a database operated by a third party independent of the vendor and users, thereby enabling the users to verify that the first transaction is a legitimate medium for obtaining the media key; and said indication comprises a copy of the public key of a content provider, thereby enabling the users to perform a verification by comparing the public key in the unlocking script of the initial input of the vendor with the copy of the public key held in the database.

9. The method of claim 1, comprising, after receiving multiple of the inputs from the users but still not enough to reach the target, the vendor adding a further input to make up at least a difference to the target.

10. The method of claim 1, comprising, in response to receiving excess inputs from users pointing to more amounts of the digital asset than required to meet the target: creating a new instance of the first transaction and adding the excess inputs to the new instance of the first transaction.

11. The method of claim 1, wherein the media key comprises a decryption key, enabling the users to perform said accessing of the item of media content at least by decrypting it using the decryption key.

12. The method of claim 1, wherein the media key is configured to enable an individual media key to be computed by each of the plurality of users, thereby enabling only the users who provided inputs to access the item of media content.

13. The method of claim 12, wherein: the media key comprises a decryption key, enabling the users to perform said accessing of the item of media content at least by decrypting it using the decryption key; and each individual media key comprises an individual decryption key.

14. The method of claim 1, wherein: each of the users' inputs comprises a respective unlocking script to unlock an output of the respective source transaction, the respective unlocking script including a respective public key of the user and a respective signature of the user formed using a private key of the user.

15. The method of claim 14, wherein: the media key is configured to enable an individual media key to be computed by each of the plurality of users, thereby enabling only the users who provided inputs to access the item of media content; and the individual media key of each user is generated based on the respective public key of the user taken from the input received from that user.

16. A method for a vendor to enable a plurality of users to access an item of media content comprising the steps of:
encrypting the item of media content such that the item of media content may be decrypted and accessed by the plurality of users using a media key, wherein the media key is a single public key of a group-based public-key encryption scheme;
hashing a payload comprising the media key;
storing on a server accessible to the plurality of users a first transaction comprising i) one or more outputs including at least a first output specifying an amount of a digital asset to transfer to the vendor, and ii) initially, a total of zero or more inputs wherein a total input amount of the digital asset specified in any outputs of any source transactions pointed to by the zero or more inputs is less than a total output amount of the digital asset specified by the one or more outputs, wherein the first output of the first transaction comprises a locking script specifying a condition to be met by an unlocking script to unlock said first output, and wherein the locking script comprises the hashed payload;
over a side channel, wherein the side channel is a packet-switched network, receiving an input from each of said plurality of users, and adding each received input to the first transaction, each received input pointing to an output of a respective source transaction specifying an amount of the digital asset; and
once a target is reached, whereby a total input amount pointed to by the inputs of the first transaction is equal to or exceeds the output amount, causing the first transaction and a second transaction to be published to a blockchain network to be recorded in a blockchain stored on a server that is part of a peer-to-peer network, wherein the second transaction comprises an input pointing to the first output of the first transaction and comprising the unlocking script meeting said condition;
wherein the condition specified by the locking script requires the unlocking script to include the media key enabling the users to decrypt and access the item of media content.

17. Computer equipment of a vendor, comprising:
memory comprising one or more memory units, and processing apparatus comprising one or more processors; wherein the computer equipment enables a method for a plurality of users to access an item of media content, the method comprising:
storing the item of media content such that the item of media content may be accessed by the plurality of users using a media key;
hashing a payload comprising the media key;
storing on a server accessible to the plurality of users a first transaction comprising i) one or more outputs including at least a first output specifying an amount of a digital asset to transfer to the vendor, and ii) initially, a total of zero or more inputs wherein a total input amount of the digital asset specified in any outputs of any source transactions pointed to by the zero or more inputs is less than a total output amount of the digital asset specified by the one or more outputs, wherein the first output of the first transaction comprises a locking script specifying a condition to be met by an unlocking script to unlock said first output, and wherein the locking script comprises the hashed payload;
over a side channel, wherein the side channel is a packet-switched network, receiving an input from each of said plurality of users, and adding each received input to the first transaction, each received input pointing to an output of a respective source transaction specifying an amount of the digital asset; and
once a target is reached, whereby a total input amount pointed to by the inputs of the first transaction is equal to or exceeds the output amount, causing the first transaction and a second transaction to be published to a blockchain network to be recorded in a blockchain stored on a server that is part of a peer-to-peer network, wherein the second transaction comprises an input pointing to the first output of the first transaction and comprising the unlocking script meeting said condition;
wherein the condition specified by the locking script requires the unlocking script to include a media key enabling the users to access the item of media content and the media key is a passcode required to download the item of media content.

18. A method for a computer of a user to access an item of media content encrypted by a vendor made available in an off-chain data source, comprising the steps of:
accessing a server of a vendor hosting a first transaction comprising i) one or more outputs including at least a first output specifying an amount of a digital asset to transfer to the vendor, and initially, a total of zero or more inputs wherein a total input amount of the digital asset specified in any outputs of any source transactions pointed to by the zero or more inputs is less than a total output amount of the digital asset specified by the one or more outputs, and wherein the first output of the first transaction comprises a locking script specifying a condition to be met by an unlocking script to unlock said first output;
over a side channel to the server, wherein the side channel is a packet-switched network, sending at least one input amongst a plurality of inputs sent by a plurality of users to be added to the first transaction, each input pointing to an output of a respective source transaction specifying an amount of the digital asset, thereby enabling the vendor, once a target is reached whereby a total input amount pointed to by the inputs of the first transaction is equal to or exceeds the output amount, to have the first transaction and a second transaction published to a blockchain network to be recorded to a blockchain stored on a server that is part of a peer-to-peer network, wherein the second transaction comprises an input pointing to the first output of the first transaction and comprising the unlocking script meeting said condition:

generating a signature by cryptographically signing at least a part of the second transaction using a private key of the user, wherein the unlocking script comprises the generated signature; and adding each received input to the first transaction, each received input pointing to an output of a respective source transaction specifying an amount of the digital asset;

wherein the condition specified by the locking script requires the unlocking script to include a media key; and wherein the method further comprises using the media key to decrypt the item of media content.

* * * * *